(12) United States Patent
Zhang (10) Patent No.: US 8,191,920 B2
(45) Date of Patent: Jun. 5, 2012

(54) SINGLE ACTION COLLAPSING/EXPANDING THREE-WHEELED GOLF CART

(75) Inventor: Sheng Zhang, Ningbo (CN)

(73) Assignee: Ningbo Wentai Sports Equipment Co., Ltd., Ningbo (CN)

( * ) Notice: Subject to any disclaimer, the term of this patent is extended or adjusted under 35 U.S.C. 154(b) by 390 days.

(21) Appl. No.: 12/694,971

(22) Filed: Jan. 27, 2010

(65) Prior Publication Data

US 2011/0181027 A1 Jul. 28, 2011

(30) Foreign Application Priority Data

Apr. 10, 2010 (JP) .................. 2009 2 0147603 U (51) Int. Cl.
- *B62B 1/04* (2006.01)
- *B62B 3/02* (2006.01)
- *B62B 3/10* (2006.01)
- *B62B 3/12* (2006.01)
- *B62B 5/06* (2006.01)

(52) U.S. Cl. ............ 280/651; 280/47.26; 280/639; 280/47.371; 280/DIG. 6

(58) Field of Classification Search ............ 280/47.17, 280/47.18, 47.19, 47.2, 47.21, 47.24, 47.26, 280/47.34, 47.35, 47.371, 639, 38, 641, 42, 280/651, 652, DIG. 5, DIG. 6; 206/315.3

See application file for complete search history.

(56) References Cited

U.S. PATENT DOCUMENTS

| | | | |
|---|---|---|---|
| 7,137,644 B2 * | 11/2006 | Kimberley | 280/651 |
| 2001/0033070 A1 * | 10/2001 | Reimers et al. | 280/651 |
| 2009/0066056 A1 * | 3/2009 | Liao | 280/297 |
| 2009/0309334 A1 * | 12/2009 | Liao | 280/639 |
| 2010/0052275 A1 * | 3/2010 | Reimers et al. | 280/47.26 |

* cited by examiner

*Primary Examiner* — John R Olszewski (74) *Attorney, Agent, or Firm* — Jen-Feng Lee, Esq.

(57) ABSTRACT

A three-wheeled golf cart having collapsible mechanism to fold the cart down for storage and transport where the folding actions for the handle assembly and the lower assembly (containing front wheel) are connected, resulting in a single action collapsing when a user pushes a button release to allow the handle assembly to be detached away from the main upper assembly and a back push rod simultaneously fold up the front wheel. A swivel joint near the front wheel support arm allows the front wheel to be locked in two positions, at 90 degrees to each other, so that the collapsed golf cart has a smaller compact volume when the front wheel is turned 90 degree from its normal usage orientation.

6 Claims, 12 Drawing Sheets

SINGLE ACTION COLLAPSING/EXPANDING THREE-WHEELED GOLF CART

FIELD AND BACKGROUND OF THE INVENTION

The present invention relates generally to a golf cart that is self-balancing and collapsible by a single-action button release, and thus is easy to use by golfers and easy to carry or put away for storage because the small and compact size when the golf cart is collapsed.

The sport of golf has gained tremendous popularity in recent years. The sport of golf, however, routinely have players carrying 11-13 clubs (or more, if playing for leisure purpose and not subject to rules promulgated by the US Golf Association) in a bag. The use of a golf cart is thus part of the needed equipment.

For ease of carrying and storage, 2-wheeled collapsible golf cart has been around for many years. The collapsing of the traditional 2-wheeled cart is a single-fold structure, though simple and easy to use, is not self-balancing and requires players' hand power to keep its rolling balance when pulling or pushing it.

Figure 1:
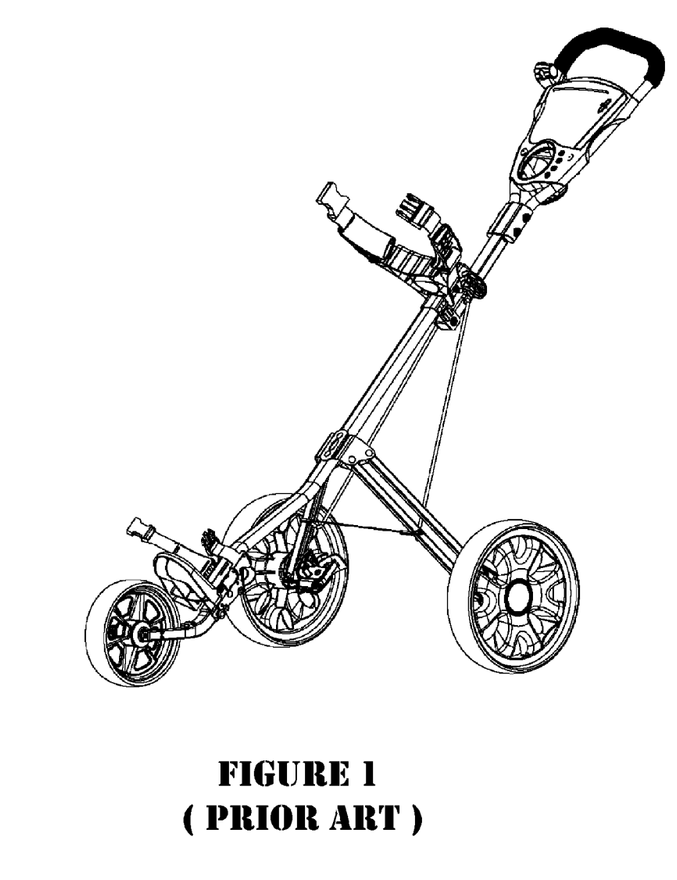
FIG. 1 shows the prior art structure of a simple 3-wheeled golf cart.

To overcome this problem, 3-wheeled golf cart is adopted, where players can leave the golf cart alone in a free-standing mode and need only pull or push it, without worrying about maintaining its balance at time of moving the golf cart. The early 3-wheeled golf cart is structurally the same as the 2-wheeled model with an added front wheel. Other than this front wheel (making it a self-balancing free-standing golf cart), the folding/collapsing mechanism is not changed or improved, as shown in FIG. 1.

Because of increased size of 3-wheeled golf cart, collapsible 3-wheeled golf cart is also invented, to reduce the size at time of transporting and storage. An example is the collapsible golf cart in U.S. Pat. No. 7,137,644, issued to Kevin Kimberley ("Kimberley 644 patent").

However, the reduced-sized 3-wheeled golf cart requires two or three separate actions to collapse and fold down the cart. The folding mechanism, including front wheel's turning an angle (as disclosed in Kimberly 644 patent) requires separate steps and sometimes cause some problems if consumers somehow mix up the operations of the several steps needed.

Present invention provides for a 3-wheel collapsible golf cart that has a collapsing mechanism different from the prior arts and provide for a "single action" collapsing, so that the folding and expanding is always intuitive and straight-forward and consumers need not worry about the sequence of the operational steps to collapse/expand the golf cart.

SUMMARY OF THE INVENTION

The structure of a 3-wheel push cart, in and of itself, cannot be patented, as this structure existed at least 100 years ago. However, the structure of a collapsible 3-wheel golf cart, as taught and disclosed herein, provides for the flexibility of folding down and reducing the size of the cart, resulting in a small and compact package, easy for transporting and storage. Not only that, due to the particular teaching disclosed herein, the collapsed compactness has a convenience that is not taught elsewhere.

Present invention uses a button-hook structure to provide for a "single action" collapsing mechanism, so that the handle assembly and the lower assembly (containing the front wheel) are both folded together towards the mid section and remove any consumer worry about the correct sequence of step to fold the separate portions of the golf cart at time of collapsing for transport and storage.

BRIEF DESCRIPTION OF THE DRAWINGS

FIG. 6b shows the exploded view of the components in FIG. 3a.

DETAILED DESCRIPTION OF PREFERRED EMBODIMENT

The single action collapsing golf cart 10 of present invention is shown in its unfolded state (expanded state) in FIGS. 5a-5f.

Three main portions make up the golf cart 10 of present invention: handle assembly 19, upper assembly 16 and lower assembly 12.

Figure 6A:
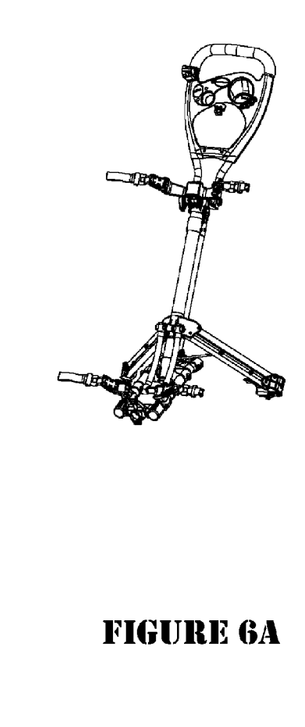
FIG. 6a shows the partial view of the golf cart, particularly about the collapsing portion.
Figure 6B:
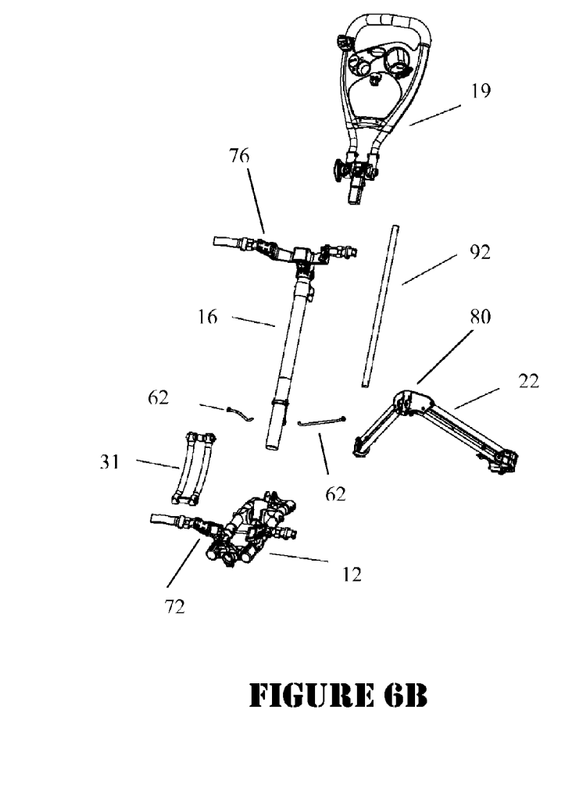
Figure 6C:
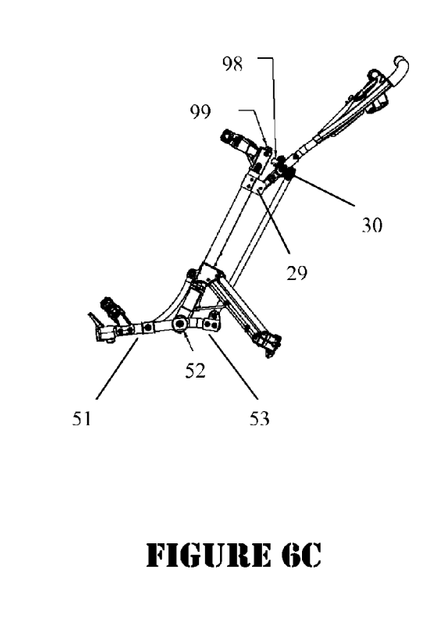
FIG. 6c shows the side view of the components in FIG. 3a, about the collapsing mechanism.

The handle assembly 19 is shaped as shown in the figures and is connected to upper assembly 16 at upper joint 29, as shown in FIG. 6c.

The handle assembly 19 works like a lever where a upper rod joint 30, located near the upper joint 29, connects handle assembly 19 to a back push rod 92, as shown in FIGS. 6b and 6c.

The lower assembly 12 is made up of a pair of generally straight tubes, forming a generally rectangular shape. A lower back joint 53 is formed on the back end bar 129 of said lower assembly 12. The lower side of said back push rod 92 is connected to said lower back joint 53.

Figure 5A:
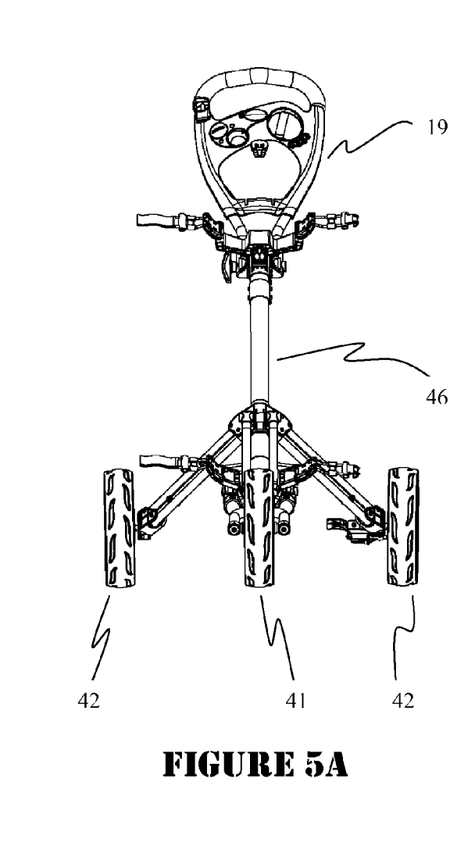
FIG. 5a shows the front view of the golf cart of present invention, in expanded position.
Figure 5B:
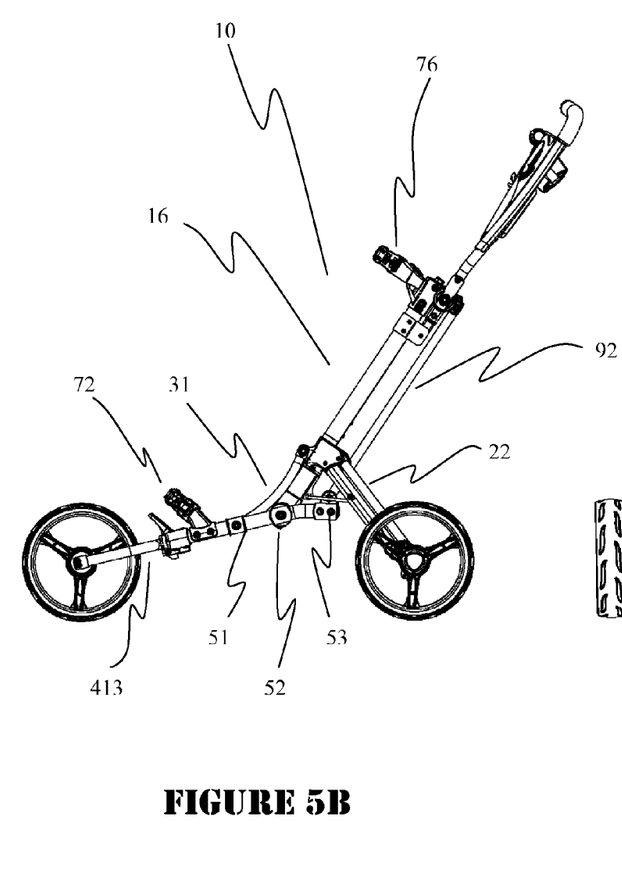
FIG. 5b shows the side view of the golf cart of present invention, in expanded position.
Figure 5C:
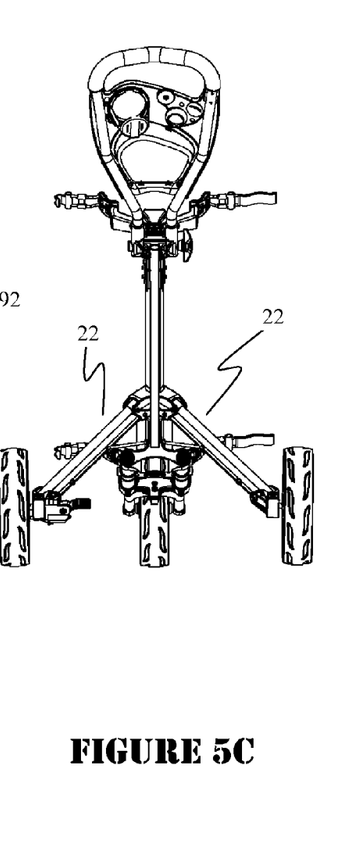
FIG. 5c shows the rear view of the golf cart of present invention, in expanded position.
Figure 5D:
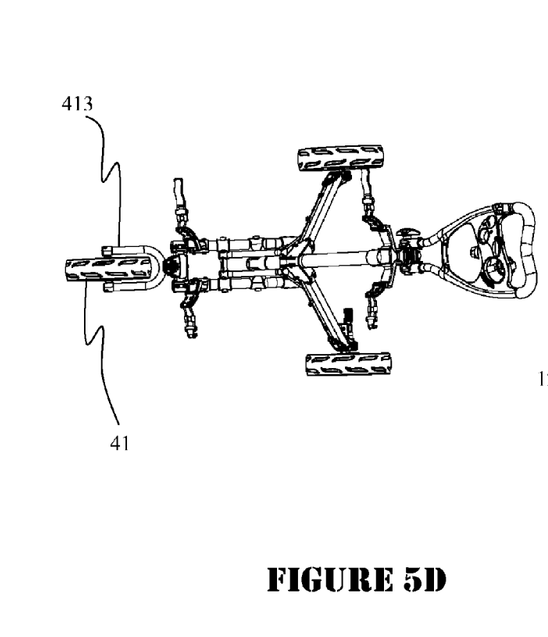
FIG. 5d shows the top-down view of the golf cart of present invention, in expanded position.
Figure 5E:
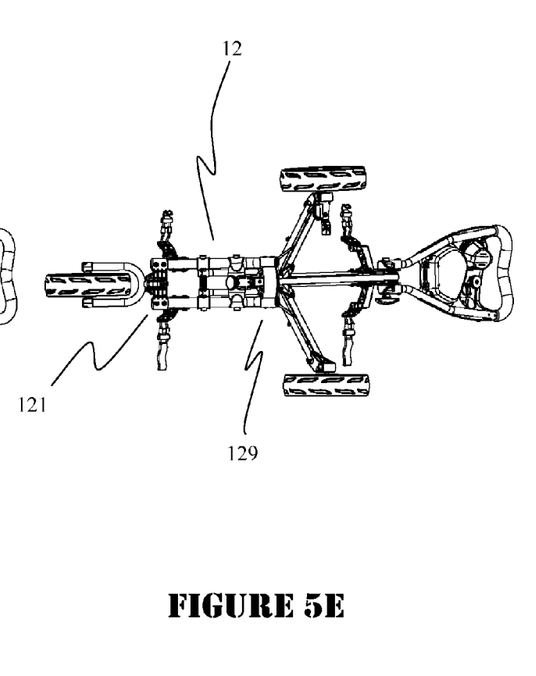
FIG. 5e shows the bottom-up view of the golf cart of present invention, in expanded position.
Figure 5F:
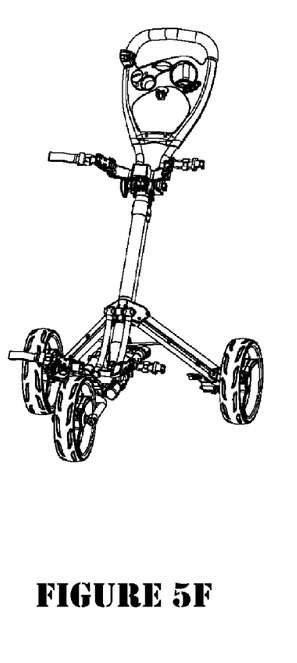
FIG. 5f shows a side perspective view of the golf cart of present invention, in expanded position.

The front side of said lower assembly 12 has a front end bar 121; see FIG. 5e. A Y-arm 413 is detachably fixed to the middle of said front end bar 121, so that a front wheel 41 is placed in the axle of said Y-arm 413.

Said back push rod 92 will stay generally parallel to the tube structure 46, whether in collapsed or expanded state, by the four joints of 29/30 (upper joint/upper rod joint) and 52/53 (lower joint/lower back joint).

The one-action collapsing/folding of the golf cart 10 of present invention is achieved by the "leverage" action of the back push rod 92, which is connected at its top end to a upper rod joint 30 located near the lower side of handle assembly 19, as shown in FIG. 6c. The back push rod 92 is connected at its lower end to a lower back joint on the back end bar 129 of the lower assembly 12.

A sliding joint 80 is slidably fixed around the tube structure 46 with two side struts 22 extending out from said sliding joint 80, so that two rear wheels 42 are supported by the lower ends of said side struts 22.

Figure 2:
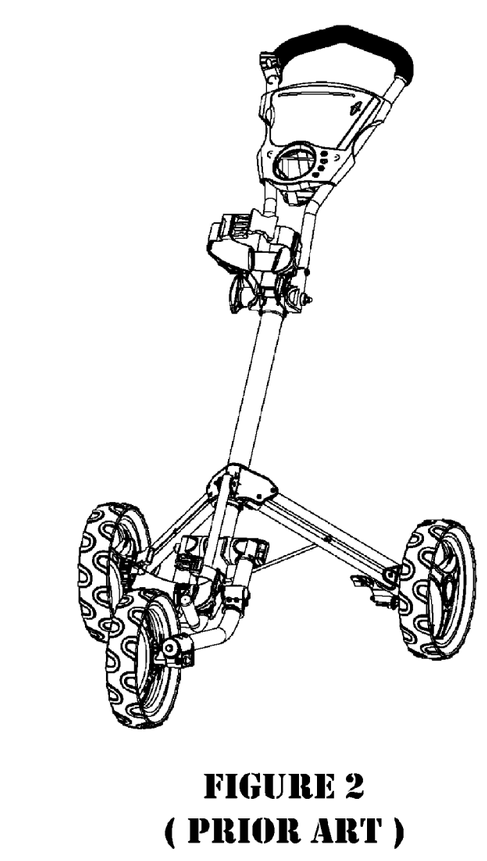
FIG. 2 shows a typical 3-wheeled golf cart where folding down the handle portion and folding up the lower portion (containing the front wheel) are two separate steps.

The structure of side strut 22 being two parallel rods to support the rear wheel is known art in the field, as shown in prior art FIGS. 1 and 2, and requires no additional disclosure herein.

A steel wire is used to stabilize the open stance of the two side struts 22 at the golf cart's expanded stated, as shown in FIG. 1 and thus is prior art known in the field that requires no additional disclosure herein.

The back push rod 92, the tube structure 46 and the sliding joint 80 along with the side struts 22 and the rear wheels 42 generally form the upper assembly 16 of present golf cart 10.

A linkage frame 31, as shown in FIGS. 6a, 6b and 6c, connects the sliding joint 80 and the lower assembly 12. A lower front joint 51 on the linkage frame 31 allows said linkage frame 31 to pivot/swivel, as the sliding joint 80 is pushed up and down the tube structure 46.

Figures 7A, 7B:
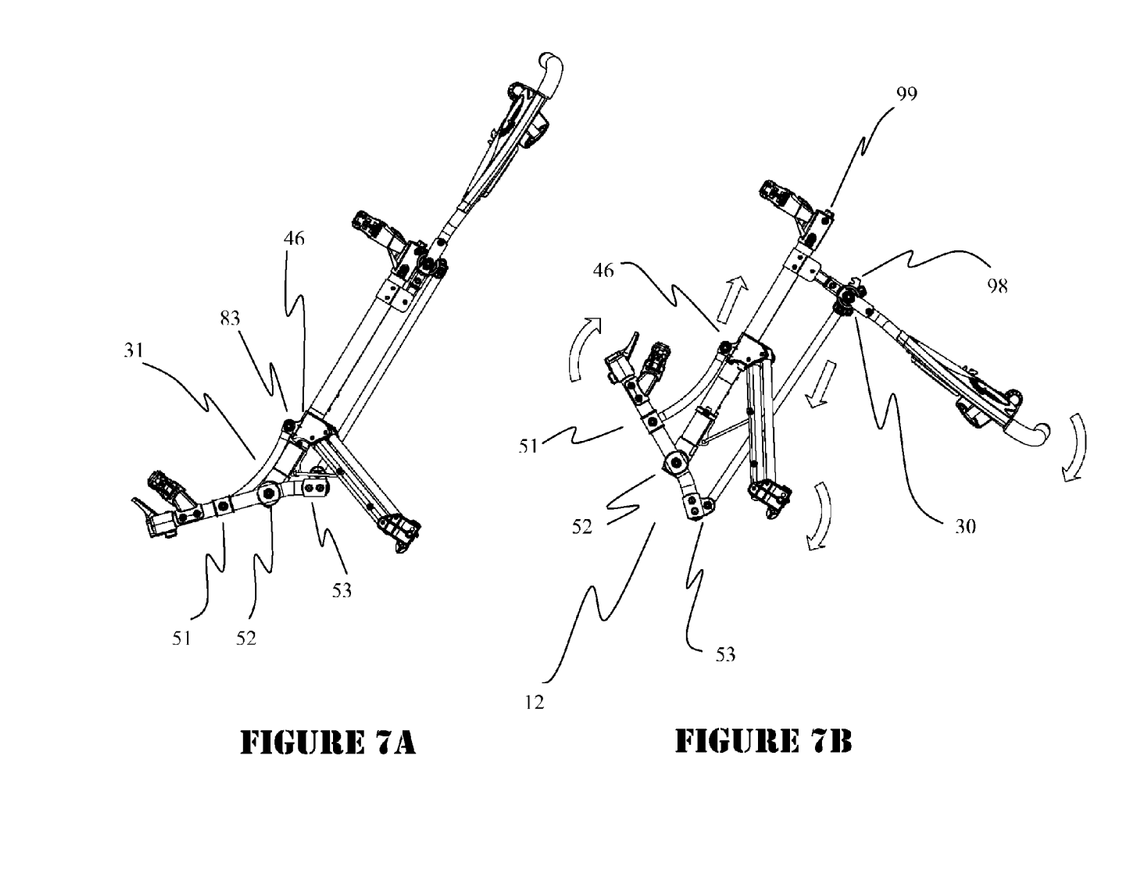
FIGS. 7a-7c show the movement sequence of folding down (collapsing) the golf cart of present invention.
Figure 7C:
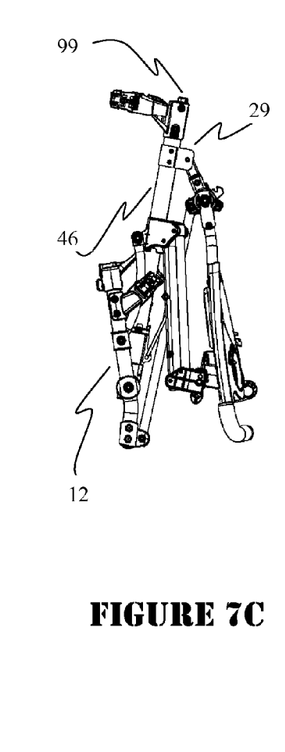
Figure 8A:
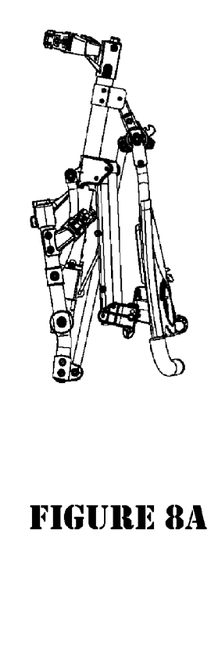
FIG. 8a-8c show the movement sequence of expanding (unfolding) the golf cart of present invention.
Figure 8B:
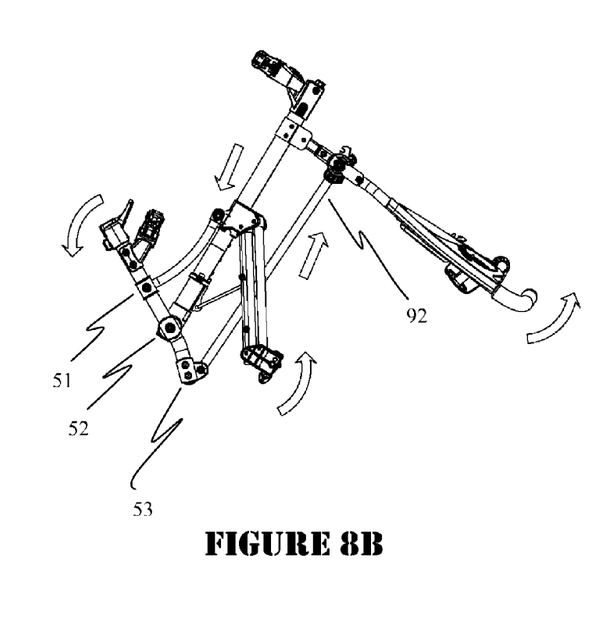
Figure 8C:
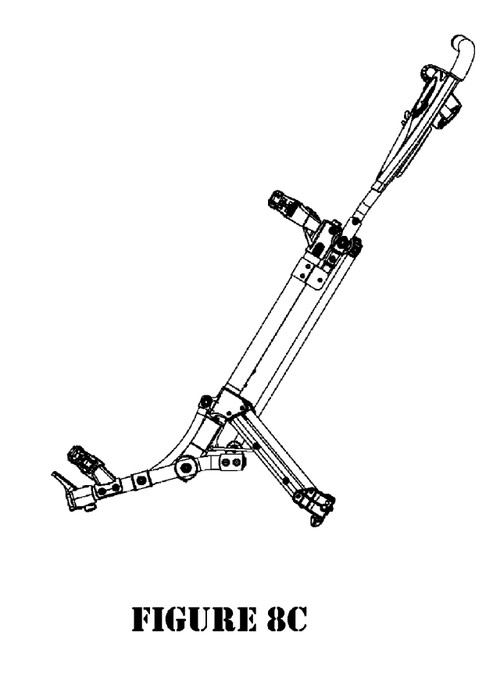

Reference the exploded view of the collapsing mechanism in FIG. 6b, as well as the folding sequence in FIGS. 7a-7c and the expanding sequence in FIGS. 8a-8c, the one-action folding/expanding structure is made clear.

From FIGS. 6b and 6c and FIGS. 7a-7c, it can been seen that when collapsing the golf cart 10, a user first push a button 99 located on top of tube structure 46, which allows hook 98 (located on the lower end of handle assembly 19) to be detached away from the position of being locked to the tube structure 46.

The button 99 structure is generally made up of an inner spring to give the resilient force to restore the button 99 to a preset position before and after a user's pushing down, so that when the button 99 is pressed down, a corresponding pin is sank lower, allowing the hook 98 to be released and the handle assembly 19 to be folded away. This spring-pin structure itself is known art in the relevant field and requires no detailed disclosure herein.

As handle assembly 19 is folded down, see the arrows in FIG. 7b, the back push rod 92 is pushed downward from the point of upper rod joint 30. The lower back joint 53, which is located on the back end bar 129 of the lower assembly 12, then pushes down back end bar 129, causing the lower assembly 12 to pivot and turn about the lower joint 52.

The lower front joint 51 pivotally connects the lower end of the linkage frame 31. The linkage frame's 31 upper portion is connected, via upper linkage joint 83, to the sliding joint 80.

As such, when the sliding joint 80 is slide up along the length of the tube structure 46, as in the process of collapsing the golf cart 10, it will cause the two side struts 22 to retract inwards towards the tube structure 46, as a result of the two link rods 62 pulling in the side struts 22 when the sliding joint 80 travels upward. FIGS. 7a-7c show the sequence of collapsing the golf cart 10 of present invention.

As such, folding/collapsing the golf cart 10 of present invention becomes very simple. A user needs only push down the release button 99, causing the unhooking action of the hook 98 of the handle assembly 19, and then the folding down of the handle assembly 19 towards the upper assembly 16 will cause the synchronous folding up of the lower assembly 12 without a second step, or any worry that whether folding down the handle portion should happen first, or folding up the lower assembly 12 (containing front wheel 41) should happen first.

When unfolding (expanding) the golf cart 10, it is intuitively simple as well. Reference FIGS. 8a-8c, a user needs only fold up handle assembly 19 (relative to the position of the tube structure 46 of upper assembly 16), the back push rod 92 will automatically cause the front wheel 41 of the lower assembly 12 to unfold away (in a counter-clockwise direction, as shown in FIG. 8b) from the upper assembly 16; as the sliding joint 80 being pulled down by the linkage frame 31, the two rear wheels 42 are extended outwards by the action of the two side struts 22, with the linking action of the two link rods 62.

An upper hold ring 76 is formed on the top end of the tube structure 46; a lower hold ring 72 is formed on the lower assembly 12 near the front end bar 121, so that, at expanded state, the golf cart 10's upper hold ring 76 and lower hold ring 72 will form a holding area for placing one golf bag.

Both upper hold ring 76 and lower hold ring 72 will have clips, straps, or other locking and tightening devices to securely keep the golf bag in place when in use.

Figure 3A:
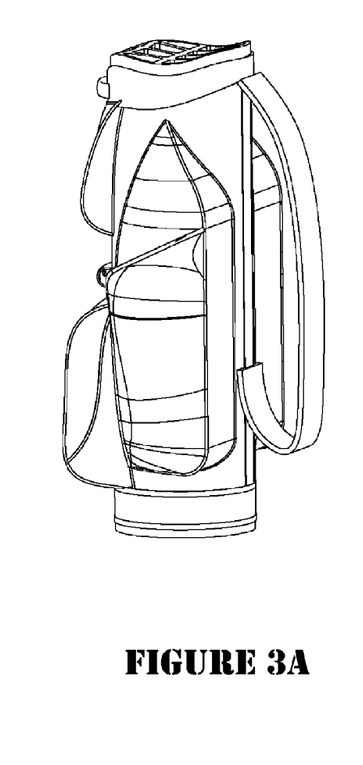
FIG. 3a shows a typical golf bag.
Figure 3B:
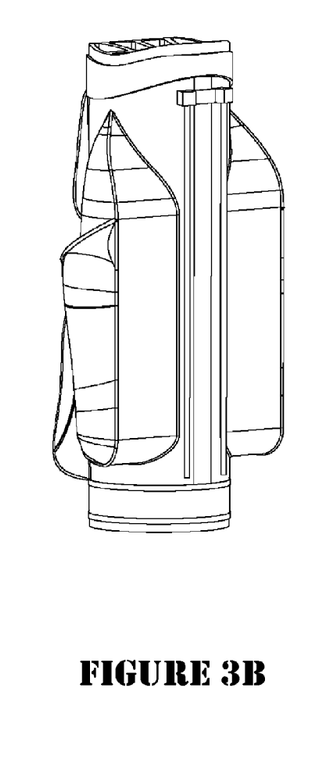
FIG. 3b shows a self-standing golf bag, standing straight with the two side sticks closely attaching to the main body of the bag.
Figure 3C:
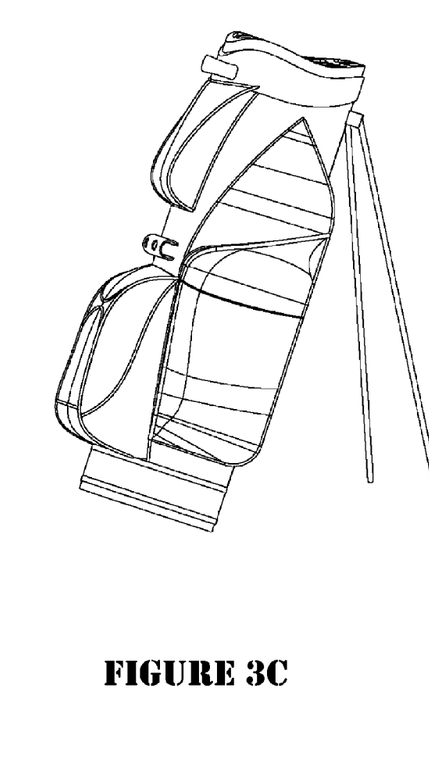
FIG. 3c shows a self-standing golf bag, standing at a tilt angle, with the two side sticks extending outward to support the tilting stance of the golf bag.
Figure 4:
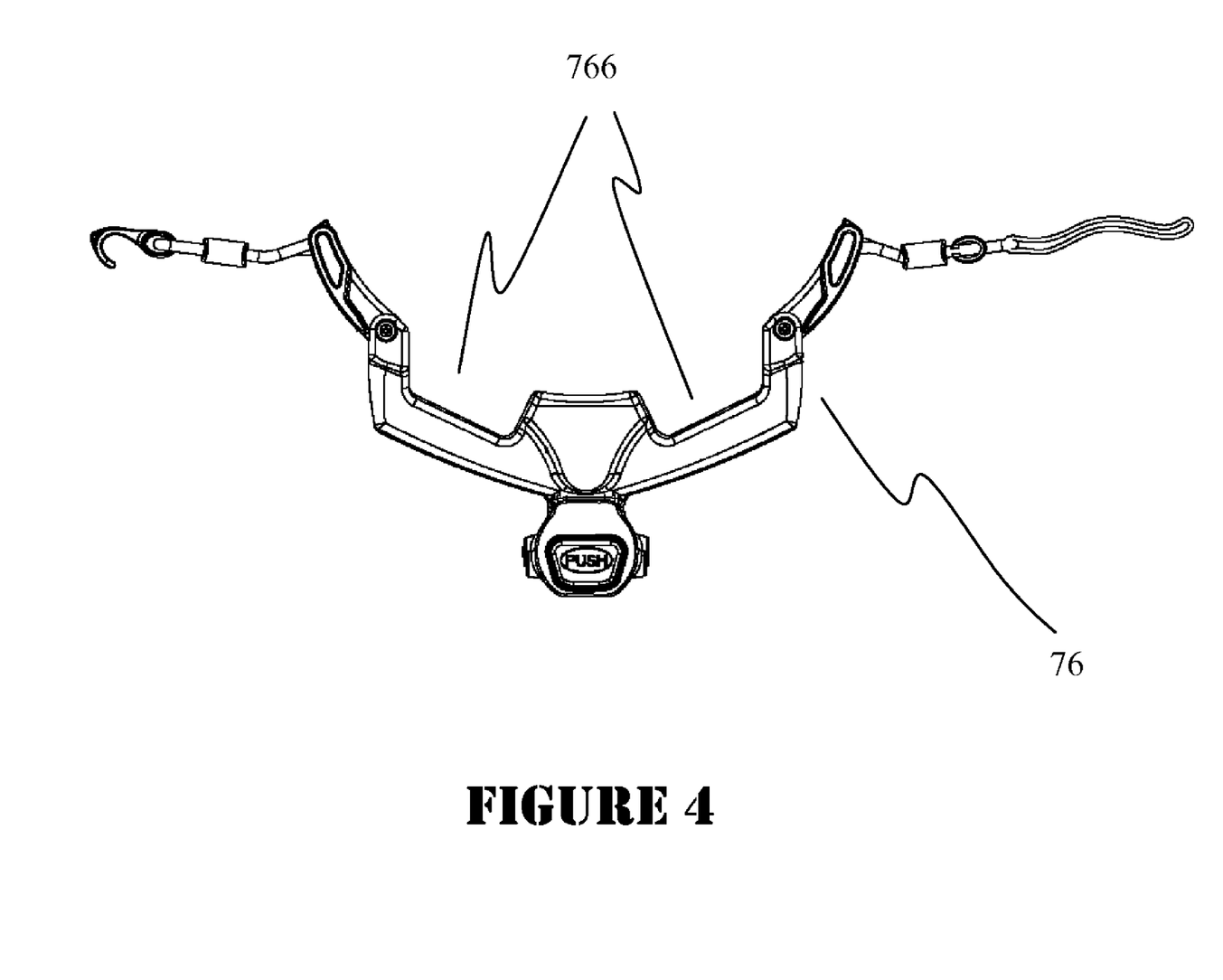
FIG. 4 shows the upper hold ring, having two notches built-in to allow the two side sticks of a self-standing bag to rest into.

Many of today's golf bags come with a self-standing feature where two side sticks will be pushed out when the bag id left standing with a slight tilt backwards, as shown in FIG. 3c. To accommodate the shape of such self-standing bag, the upper hold ring 76 has two notches 766, as shown in FIG. 4a, so that the golf bag's two side sticks will be sinking into the two notches 766 and will not cause the golf bag to spin or turn when placed into the holding space between upper hold ring 76 and lower hold ring 72.

Figure 10A:
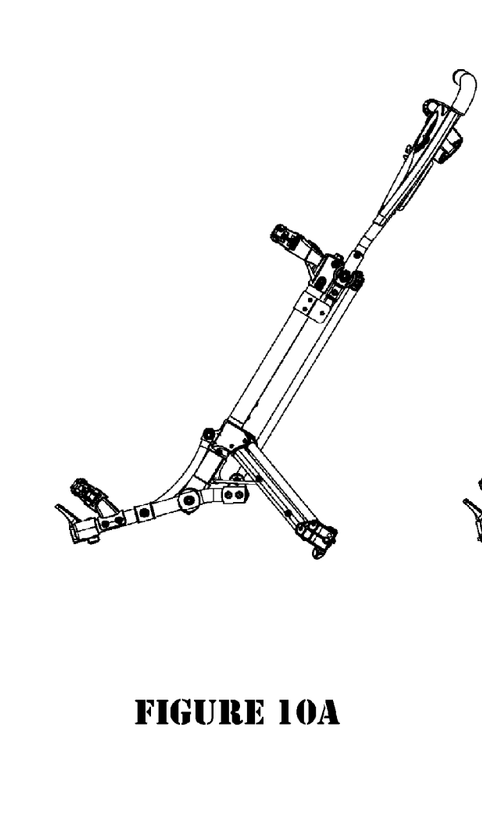
FIGS. 10a-10c show the angle adjustment for the handle assembly, in the golf cart's expanded state.
Figure 10B:
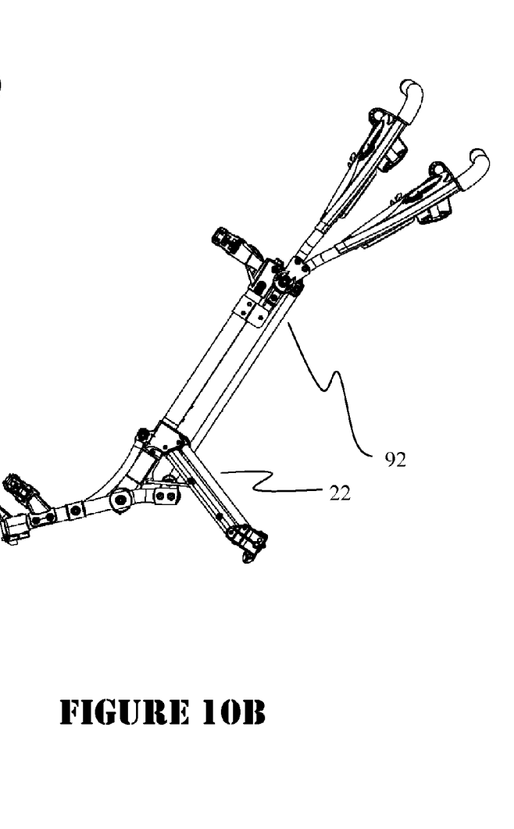
Figure 10C:
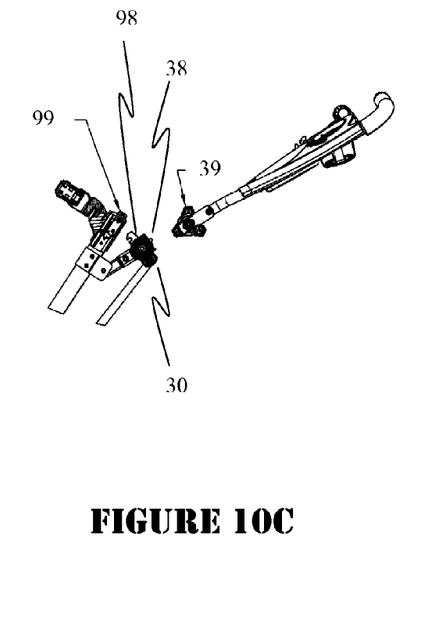

FIGS. 10a-10c show the lower part of the handle assembly 19 further having an angle adjustment joint 38, located near the upper rod joint 30. An angle adjustment knob 39 is built to the axle position of said angle adjustment joint 38, so that a range of angle adjustment is provided to the handle assembly 19. By losing (and tightening, after adjustment) said an angle adjustment knob 39, a user can make adjustment to the angle of handle assembly 19 relative to the upper assembly 16, resulting in the top tip of the handle assembly 19 to a different height at the golf cart 10's expanded position, as desired by user preference.

Figure 9A:
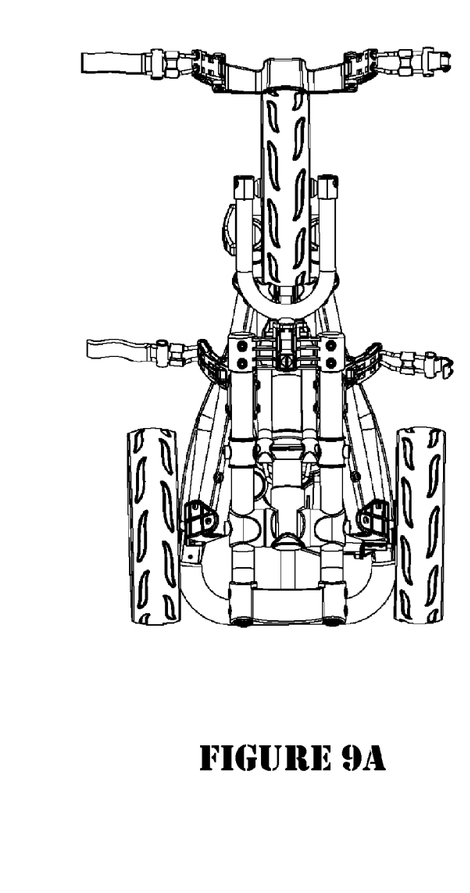
FIG. 9a shows the front view of the golf cart of present invention, in collapsed position.
Figure 9B:
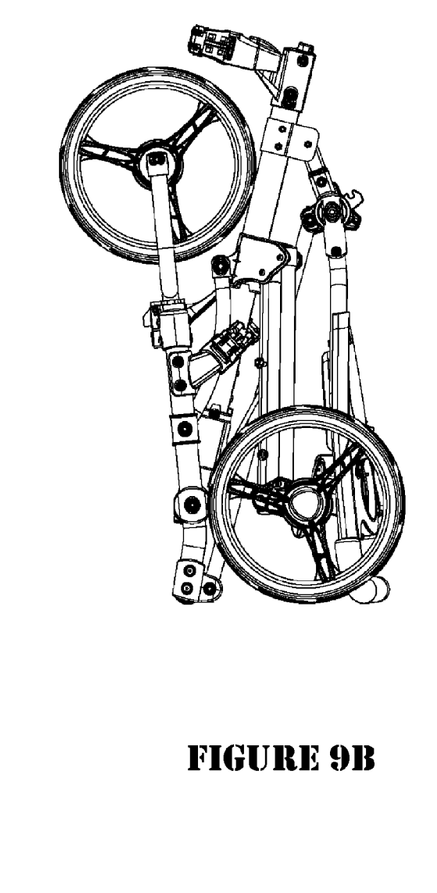
FIG. 9b shows the side view of the golf cart of present invention, in collapsed position.
Figure 9C:
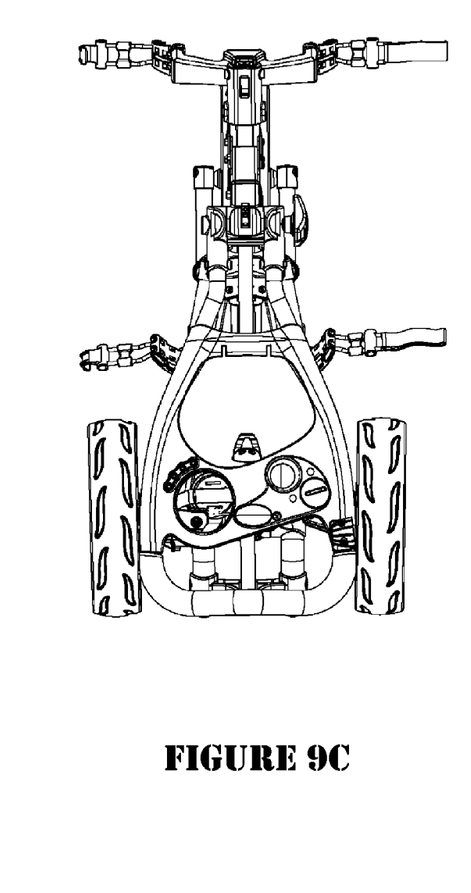
FIG. 9c shows the rear view of the golf cart of present invention, in collapsed position.
Figure 9D:
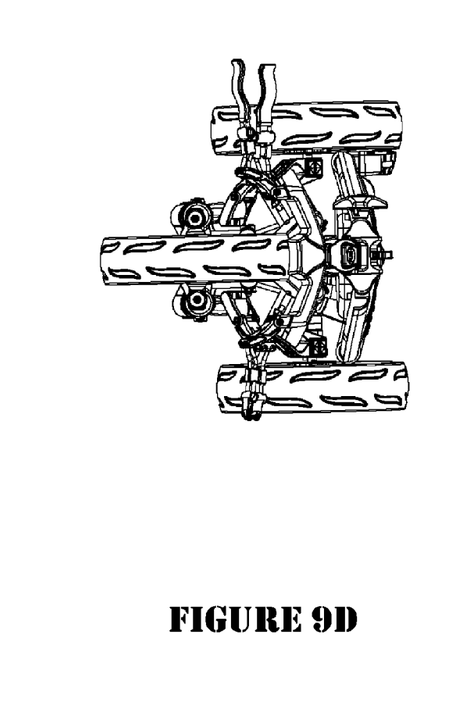
FIG. 9d shows the top-down view of the golf cart of present invention, in collapsed position.
Figure 9E:
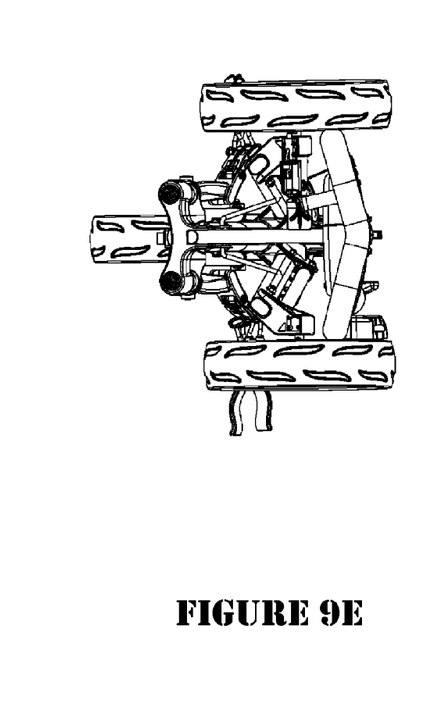
FIG. 9e shows the bottom-up view of the golf cart of present invention, in collapsed position.
Figure 9F:
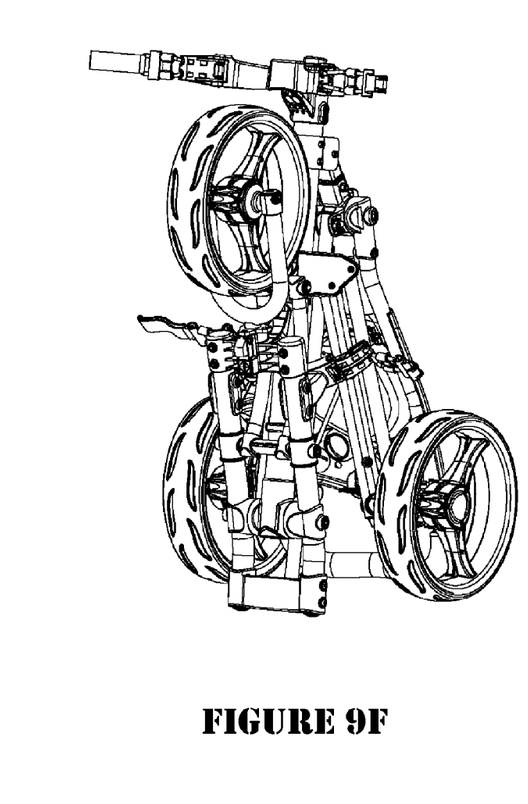
FIG. 9f shows the side perspective view of the golf cart of present invention, in collapsed position.
Figure 11A:
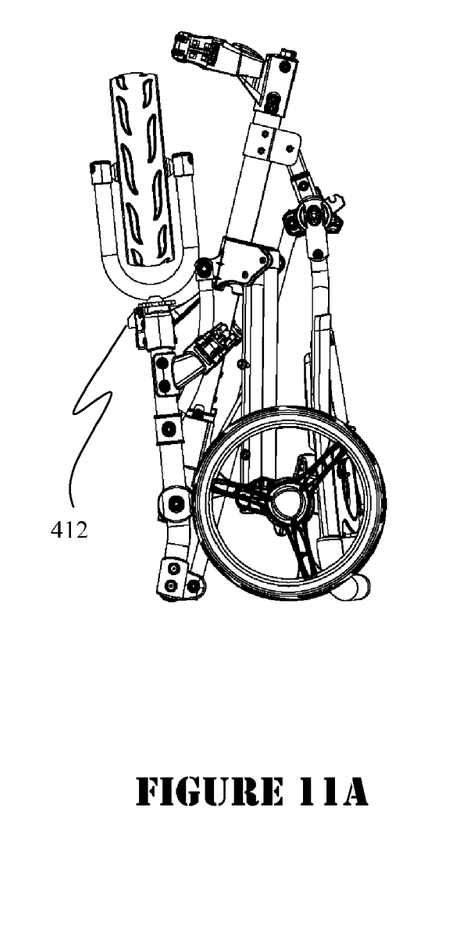
FIGS. 11a and 11b show a swivel joint on the Y-arm to allow for a 90-degree turn of the front wheel.
Figure 11B:
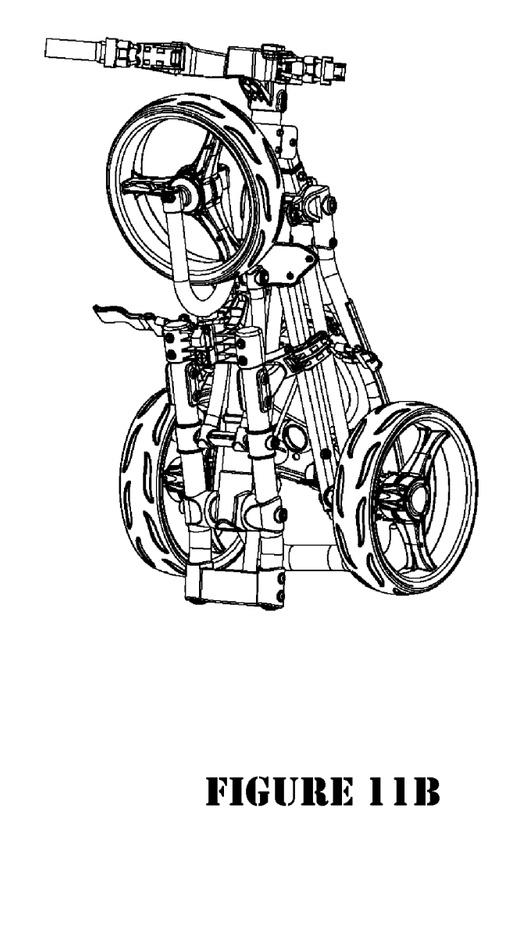

A swivel joint 412 is optionally made to the Y-arm 413, as shown in FIG. 11*a*, so that at time of collapsing the golf cart 10, the front wheel 41 can be turned 90 degrees, from the position in FIG. 9*f* to the position in FIG. 11*b*, creating a smaller compact volume for storage and transport.

The swivel joint 412 will allow the front wheel to be locked in two positions: one as shown in FIG. 9*f* and other expanded positions for normal usage, where the front wheel 41 is aligned with the line movement of the golf cart; and a second position allows the front wheel 41 to be locked at a 90-degree orientation, as shown in FIG. 11*b*, so that the collapsed golf cart 10 has a flat and smaller volume.

What is claimed is:

1. A collapsible golf cart comprising:
   A handle assembly;
   An upper assembly further comprising a tube structure, a back push rod, a sliding joint with a pair of extending side struts to support two rear wheels;
   A lower assembly connected to said tube structure of upper assembly by a lower joint, further having a lower front joint connected to said sliding joint by a linkage frame and a lower back joint connected to said handle assembly by a back push rod; and,
   A Y-arm extending out from a front end bar of said lower assembly to support a front wheel.

2. The collapsible golf cart of claim 1, further comprising a pair of link rods with one end pivotably connecting the pair of side struts and the other end pivotably connecting to the lower end of said tube structure, so as to guide the retracting or expanding of the two side struts when the cart is being collapsed or expanded.

3. The collapsible golf cart of claim 2, further comprising a locking and releasing mechanism of a button and hook structure where a hook on the lower portion of said handle assembly will be secured to a button structure having an inner spring with a pin near the top of said tube structure of upper assembly, so that when the button is pushed, said hook will be released from the pin, allowing the handle assembly to be folded down, pushing down the back push rod, and folding the lower assembly up towards the upper assembly.

4. The golf cart of claim 1, further having an upper hold ring and a lower hold ring for securing a golf bag in place where said upper hold ring contains two notches for easily accommodating the two side sticks of a self-standing golf bag.

5. The golf cart of claim 1, wherein the handle assembly further having an angle adjustment joint near the upper rod joint, and said angle adjustment joint is fitted with an adjustment knob to allow some angle adjustment of the handle assembly to fit user's height and convenience 6. The golf cart of claim 1, wherein said Y-arm further having a swivel joint so that the front wheel can be made to be locked in two 90-degree angled position, to enable a smaller compact volume of the collapsed golf cart for storage and transport.

* * * * *

UNITED STATES PATENT AND TRADEMARK OFFICE
CERTIFICATE OF CORRECTION

PATENT NO. : 8,191,920 B2  
APPLICATION NO. : 12/694971  
DATED : June 5, 2012  
INVENTOR(S) : Sheng Zhang Page 1 of 1

It is certified that error appears in the above-identified patent and that said Letters Patent is hereby corrected as shown below:

On the Title Page:

Item (73), the Assignee name of Ningbo Wentai Sports "Equipmant" Co., Ltd., Ningbo (CN) should read --Equipment--.

Item (30), for Foreign Application Priority Data, Apr. 10, "2010 (JP)" should read --2009 (CN)--.

Signed and Sealed this  
Seventeenth Day of July, 2012

David J. Kappos  
*Director of the United States Patent and Trademark Office*